April 29, 1958 R. E. HOWE ET AL 2,832,538

ROTARY BRUSH FEED

Filed Dec. 24, 1954 5 Sheets-Sheet 1

INVENTORS
Russell E. Howe
Paul J. Morisy
BY
ATTORNEY

April 29, 1958 R. E. HOWE ET AL 2,832,538

ROTARY BRUSH FEED

Filed Dec. 24, 1954 5 Sheets-Sheet 2

INVENTORS
Russell E. Howe
Paul J. Morisy
BY [signature]
ATTORNEYS

April 29, 1958 R. E. HOWE ET AL 2,832,538

ROTARY BRUSH FEED

Filed Dec. 24, 1954 5 Sheets-Sheet 3

INVENTORS
Russell E. Howe
BY Paul J. Morisy
P. G. Renninger
ATTORNEYS

INVENTORS
Russell E. Howe
BY Paul J. Morisy
ATTORNEY

ROTARY BRUSH FEED

Filed Dec. 24, 1954 5 Sheets-Sheet 5

INVENTORS
Russell E. Howe
Paul J. Morisy
BY
ATTORNEYS

United States Patent Office 2,832,538

Patented Apr. 29, 1958

2,832,538

ROTARY BRUSH FEED

Russell E. Howe, Endicott, and Paul J. Morisy, Johnson City, N. Y., assignors to International Business Machines Corporation, New York, N. Y., a corporation of New York Application December 24, 1954, Serial No. 477,547

12 Claims. (Cl. 235—61.11)

This invention relates to a device for reading tabulating cards in a computing machine, and more particularly to holding tabulating cards and moving the sensing brushes across the tabulating cards during reading.

Tabulating cards are fed into a reading device for the taking of information from the cards during which operation the cards are intermittently fed through the reading device and delivered to a stacker. The reading of the information on the cards is accomplished through brushes extending through perforations in the cards to contact sensing elements on the other side of the card to cause conduction which translates the information on the cards. It is advantageous in the design of reading apparatus to arrange an entrance and an exit of cards on the same side of the apparatus. Consequently, the cards are fed in a loop around the inside of the feeding apparatus. This permits the sensing mechanism to be arcuate in nature and as a result, some of the parts are rotatable on an axis.

It is an object of this invention to provide a tabulating card reading apparatus for sensing across a stationary card during the reading operation.

It is another object of this invention to provide a tabulating card reading apparatus having means for feeding the tabulating cards intermittently to sensing stations and holding the cards stationary during the reading operation.

It is still another object of this invention to provide a sensing means in a tabulating card reading apparatus which is extendible to read the cards and subsequently retractable.

Still another object of this invention is a means for pressing against the cards during the reading operation with retractable sensing means.

A still further object of this invention is the constant rotation of the sensing means around an axis common to the axis of the passage of the cards through the reading apparatus.

As a further object, this invention provides means for repetitively reading a single card and also means for comparing two cards in the reading apparatus simultaneously. This invention is also intended to eliminate static reading and has as an object sweeping or maintaining card perforations clear of foreign matter.

These and other objects of this invention will become more apparent upon consideration of the following description, taken together with the accompanying drawings, in which.

In general, this invention provides means for feeding cards intermittently to sensing stations in a tabulating card reading apparatus and deriving the information from perforations in the tabulating cards by a retractable and extendible sensing means, while holding the cards with a retractable and extendible card contacting means. The sensing means and the card contacting means are continuously movable and move across the card during the sensing and card contacting operation. The means for feeding the cards to and from the sensing stations is intermittently operable and the actuating means for the extension and retraction of the sensing and card contacting means is stationary with relation to said means.

Figures 1, 7:
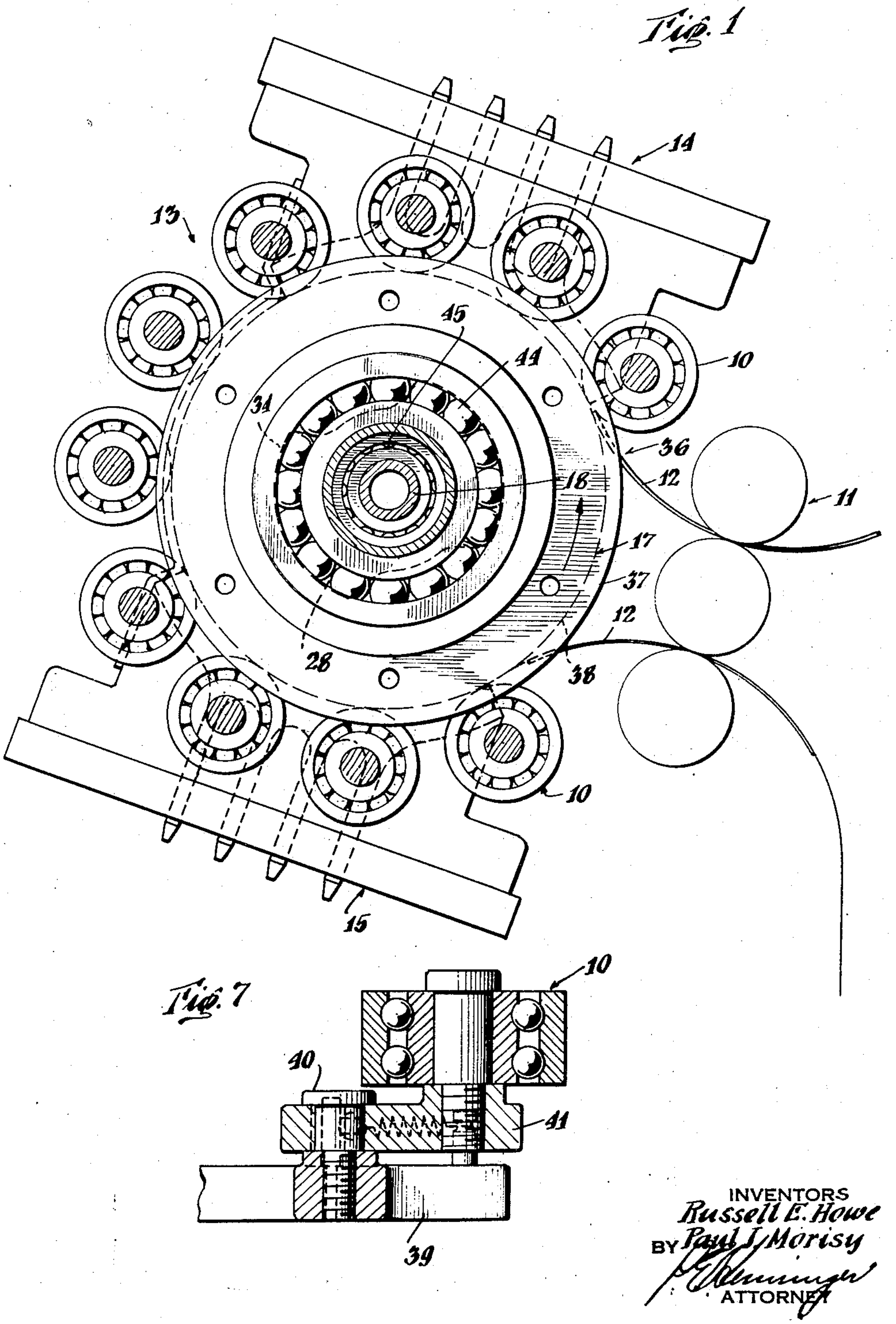
Figure 1 is a radial view of the feeding apparatus for a tabulating card reading device of this invention.
Fig. 7 is a horizontal section taken on the line VII—VII of Fig. 4 showing the card gripping mechanism of the feeding apparatus.

In Fig. 1 a tabulating card reading apparatus is shown in an end view. This invention may be embodied in this device. A train of feed rolls 10 in the device operate to guide tabulating cards 12 delivered from a feeding apparatus 11 to a reading apparatus 13. Upon reaching a first sensing station 14, the card 12 in the feed rolls 10 may be held stationary by an intermittent operation. The continued operation of the feed rolls 10 passes the tabulating cards 12 to a second sensing station 15 where the cards may be held stationary by the intermittent feed operation. The sensing means and the retractable and extendible card contacting means described in detail below, are continuously movable and move across the card 12 when it is held stationary in a sensing station. The independence between the motion of the sensing means and the motion of the card feed means allows the cards to be sensed more than once while held in a secure sensing station. After the second sensing station 15, the card 12 will pass from the reading apparatus 13 by further operation of the rotatable card moving mechanism 36 and be delivered to a stacker.

Figure 2:
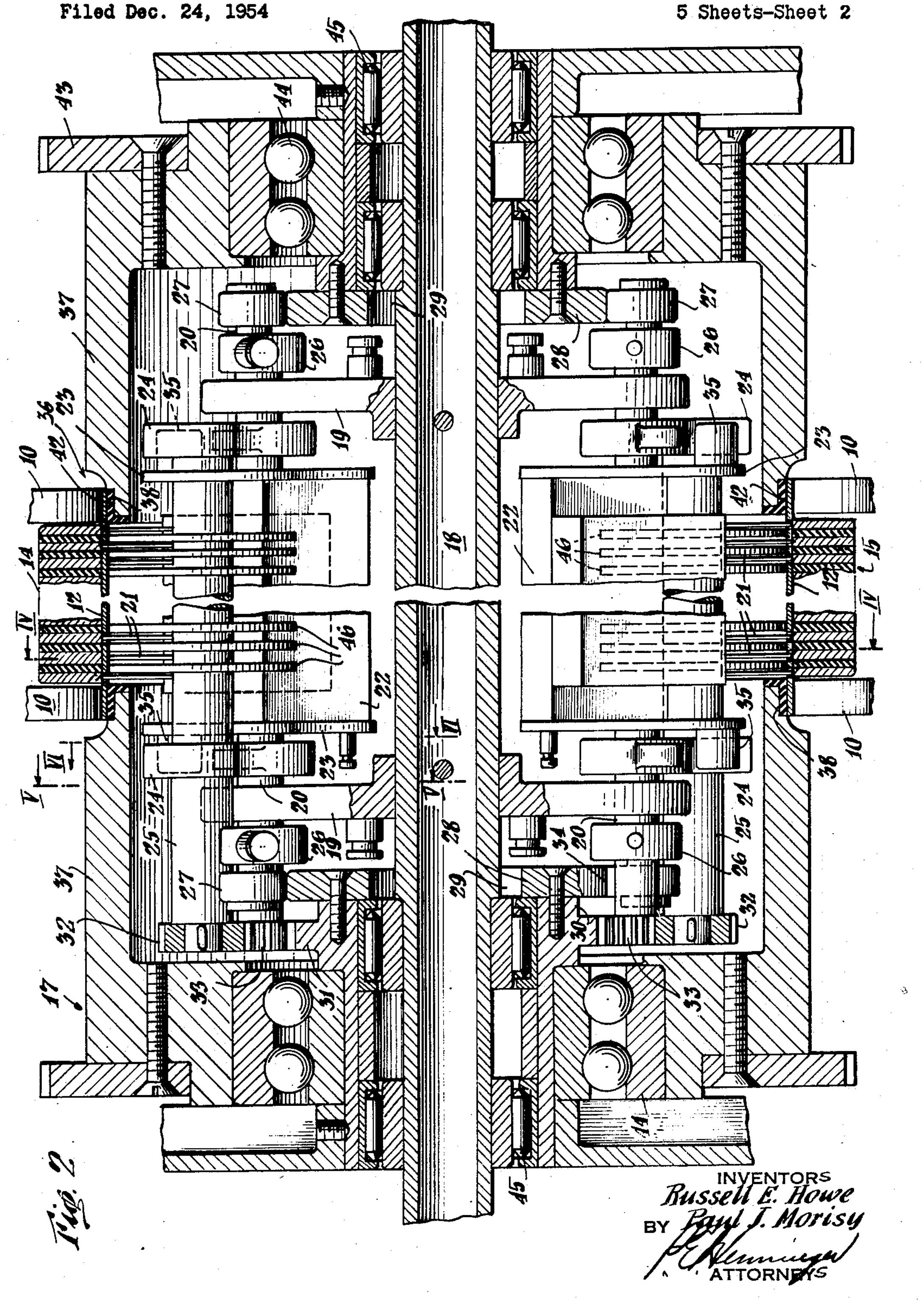
Fig. 2 is an axial section of the reading brush supporting mechanism of this invention.

In Figs. 2 through 7 various views of a reading apparatus 13 of this invention are shown in sectional or disassembly views. In Fig. 2 a brush supporting mechanism 17 is rotatably positioned in the center of the reading apparatus 13 within the loop formed by the feed rolls 10 and the circle formed by the arcuate sensing stations 14 and 15. The brush supporting mechanism 17 is mounted on a shaft 18 which is constantly rotatable and carries in constant rotation an arm 19, as shown in Fig. 2. The arm 19 extends diametrically from the axis of the shaft 18 in two directions and supports adjacent its two outer extremities a pair of identical shafts 20. The shafts 20, in turn, support the sensing brushes 21 and the means for causing the sensing brushes 21 to be retractable and extendible. The brushes 21 make contact with sensing bars 48 in each of the stations 14 and 15. The bars 48 are electrically isolated from each other by suitable insulation.

Figure 3:
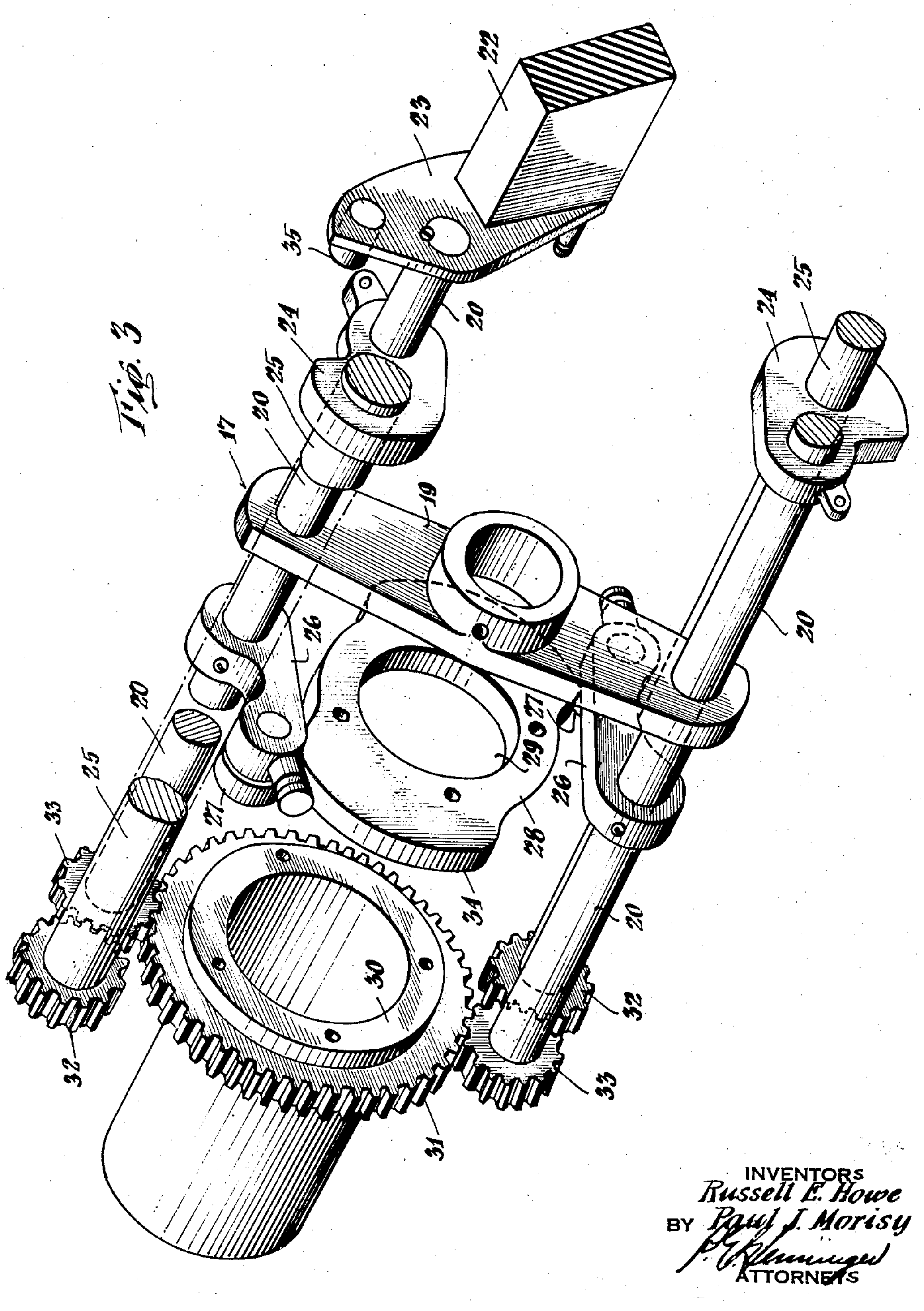
Fig. 3 is an isometric view of selected parts of the mechanism of Fig. 2.

Referring to Fig. 3, the isometric drawing shows some of the parts of the supporting mechanism 17 in an exploded view for the purpose of clarity and simplicity. The main shaft 18 is omitted and the arm 19 is shown supporting the shafts 20. The sensing brushes 21 are not shown but a brush block 22 is shown supported on a brush block holder 23, which, in turn, is supported on and revolves with its respective shaft 20 about the shaft 18. It will be understood that the brush supporting mechanism 17 is composed of two diametrically positioned duplicate sets of parts, so that two sets of sensing devices are rotated around the shaft 18. Consequently, it is possible for the mechanism 17 to produce two sensing operations at the same time. Consequently, the brush block 22 and the brush block holder 23, which are shown in connection with the upper shaft 20 in Fig. 3, are duplicated in the mechanism on the lower shaft 20 as shown in Fig. 2, though not shown in Fig. 3.

Referring again to Fig. 3, the shafts 20 are also provided with respective pressure roll cranks 24 which revolve around the axis of shaft 18 with their respective shafts 20 and which are reciprocable on their respective shafts 20. Each of the pressure roll cranks 24 in turn carry a pressure roll shaft 25 which extends axially of the mechanism 17 parallel to the shafts 18 and 20. The shafts 20 each have mounted thereon a cam follower arm 26. The cam follower arms 26 each carry a cam follower 27 which rides on the pitch or cam surface of a cam 28. The cam 28 is axial to the shaft 18, so that the pitch circle of the cam 28 is concentric to the shaft 18. The cam 28 is provided with a large central aperture 29 through which the shaft 18 passes, as shown in Fig. 2.

Referring further to Fig. 2, it is seen that the cam 28 is fixed to a quill 30. The quill 30 is stationary in the reading apparatus 13 and with relation to the remainder of the brush supporting mechanism 17, so that the brush supporting mechanism 17 with its constantly rotating shaft 18, is constantly moving with relation to the quill 30 and the cam 28.

Referring again to Fig. 3, the quill 30 is shown with an external gear track 31 peripherally encompassing the quill 30 adjacent the end to which the cam 28 is attached. The shafts 20 each journal on a respective spur gear idler 33 which meshes with the gear track 31 and rotates as the shafts 20 are revolved upon rotation of the shaft 18 and its associated parts in the brush supporting mechanism 17 around the stationary quill 30. The pressure roll shafts 25 are also each provided with a respective spur gear 32 meshing with the related idler gear 33. The brush block holder 23, carried on its respective shaft 20, revolves around the shaft 18 and is reciprocated with the motion of the cam follower 27 riding on the pitch surface 34 of the cam 28, as both the brush block holder 23 and the cam follower arm 26 are fixed on the shaft 20. On the other hand, the pressure roll cranks 24 are rotatably mounted on their respective shafts 25. Each of the brush block holders 23 has a pin 35 perpendicularly extending from its surface adjacent the juxtaposed pressure roll crank 24. The pins 35 are engageable with their respective pressure roll cranks 24 to cause the pressure roll cranks 24 to journal on the shafts 20. The relative rotation of the pressure roll cranks 24 causes the pressure roll shafts 25 to rotate about the shafts 20.

Figure 4:
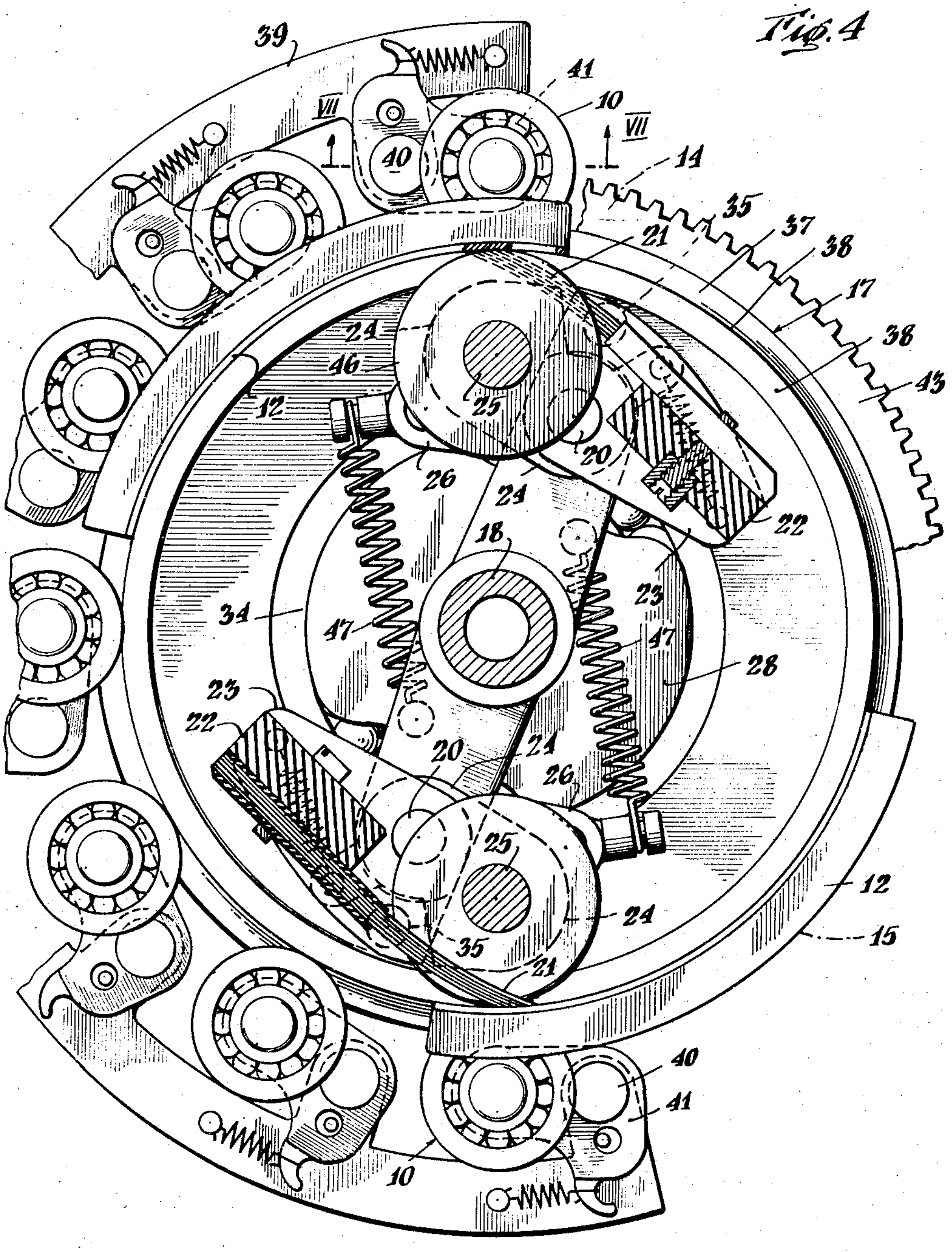
Fig. 4 is a radial section of the mechanism of Fig. 2, taken on line IV—IV.

The brush supporting mechanism 17 rotates with relation to the quills 30 at each end of the device and also with relation to the card moving mechanism 36. This card moving mechanism 36 moves independently of the brush supporting mechanism 17. Thus the motion of the card moving mechanism 36 is intermittent while the brush supporting mechanism 17 moves continuously. The card moving mechanism 36 is made up of the rolls 10 and a pair of drums 37 which are positioned at each of the ends of the reading apparatus 13 and encasing the brush supporting mechanism 17 and its two quills 30. Each of the drums 37 has formed at its inner edge a track 38 which extends circumferentially around its respective drum 37, as shown in the radial view of Fig. 4. In Fig. 4, a portion of the train of rolls 10 is shown surrounding a portion of one of the drums 37. Each of the rolls 10 is in contact with the surface of the drum 37 or a card 12 which is interposed therebetween. As seen in Fig. 2 each drum 37 is recessed adjacent its axially inner edge to form the respective tracks 38 in which the rolls pass across the surface of the drum 37, which moves with respect to the stationary rolls 10. One of the rolls 10 is shown on an enlarged scale in Fig. 7. The mounting 39 is provided with a pivot pin 40 on which is mounted a reciprocable arm 41. The roll 10 is mounted on the arm 41 by ball bearing mounting. Each of the rolls 10 is supported on a pivot pin 40 by a reciprocable arm 41. The rolls 10 are spring biased in contact with the drums

37. The tracks 38 on the drum are provided with a friction material 42 to provide gripping power to the card moving mechanism. The cards 12 are friction gripped between the drums 37 and the rolls 10 and are held stationary when the card moving mechanism is stationary in its intermittent motion.

The card moving mechanism 36 is operated by intermittently rotating the drums 37 through intermittently operated gearing (not shown) which meshes with gears 43, provided on the axially outer end of the drums 37. The periods of rest and motion of the card moving mechanism and the drums 37 specifically may be phased with respect to the cycle of rotation of the brush supporting mechanism to provide a double pass of the brushes 21 across the card 12 in each stationary phase during which the card 12 is held in one of the sensing stations 14 or 15. The rotation of the drums 37 moves the cards circumferentially through the reading apparatus 13 and to and from the sensing stations 14 and 15, as indicated in Fig. 1.

Referring again to Fig. 2, bearings 44 are shown supporting the drums 37 on the quills 30. Similarly, bearings 45 support the brush supporting mechanism 17 in the quills 30 through the shaft 18. The pressure roll shaft 25 has centrally mounted thereon pressure rolls 46 which are interposed between the brushes 21 mounted in the brush block 22. The pressure rolls 46 and the sensing brushes 21 extend radially of the reading apparatus 13 and are interposed between the tracks 38 of the drums 37, as seen in Fig. 2. Each of the two sets of sensing brushes 21 of this embodiment of this invention is made up of 80 brushes, designed to extract information from standard I. B. M. tabulating cards. Interposed between the brushes 21 of these 80-brush sets are 79 pressure rolls 46. When the brushes 21 are operating to detect perforations in the cards 12, as shown in Fig. 2, the pressure rolls 46 abut against the inner surface of the card 12 and serve to hold and stabilize the card 12 during the reading operation as the brushes 21 sweep across the card 12.

It is thus seen that the reading apparatus 13 is made up of the sensing stations 14 and 15 and the brush supporting mechanism 17 constantly rotating inside of and with relation to the intermittently rotatable card moving mechanism 36 and the stationary supporting quill 30 with its fixed cam 28.

In Fig. 4, the pressure rolls 46 and the brushes 21 are shown in their extended card reading and card contacting position. As noted above, it is the purpose of this invention to provide these components with radial retractability with relation to the cards 12 and the sensing stations 14 and 15. This retractability and its corresponding extendibility is provided by means of the action of the cam follower arm 26, the brush block holder 23 and the brush roll crank 24 for the respective sides of the respective sets of brushes 21 and pressure rolls 46. As will be understood from the study of Fig. 2, the assembly of the cam 28, cam follower 27, pressure roll crank 24, pressure roll shaft 25 and cam shaft 20 with its supporting arm appears in four places in the reading apparatus 13. This combination is provided on each side of the two sets of reading brushes 21 and pressure rolls 46. It will, therefore, be understood that the description herein relating to this combination of components is equally applicable to any one of these combinations. Similarly, the gears 33 and 32, which appear at the left side of the brush supporting mechanism 17 in Fig. 2, are respectively journaled on the shaft 20 and attached to the pressure roll shaft 25 so as to rotate the pressure rolls 46. The description herein relating to either of these two sets of gears 32 and 33 is applicable to both of the sets.

Figure 5:
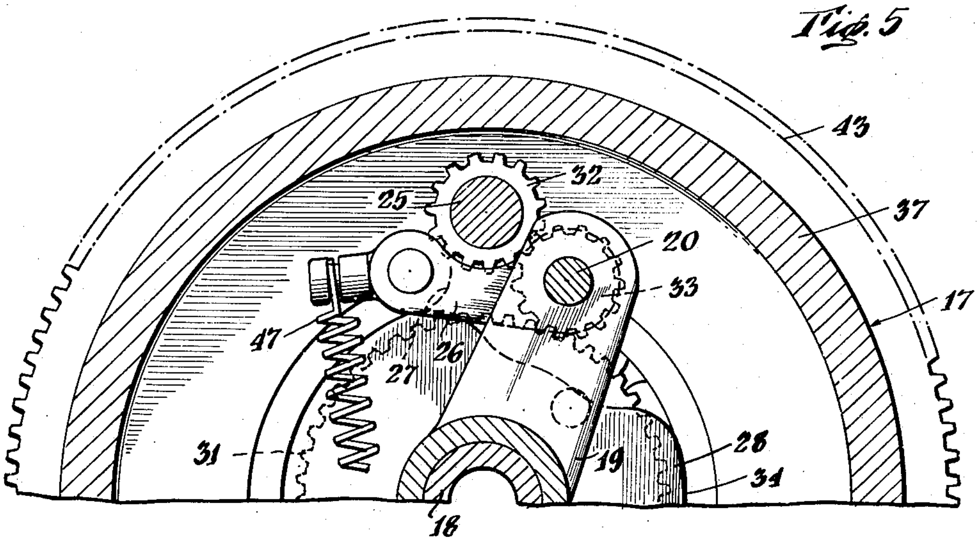
Fig. 5 is a radial section of the upper hemisphere of the mechanism of Fig. 2, taken on line V—V.
Figure 6:
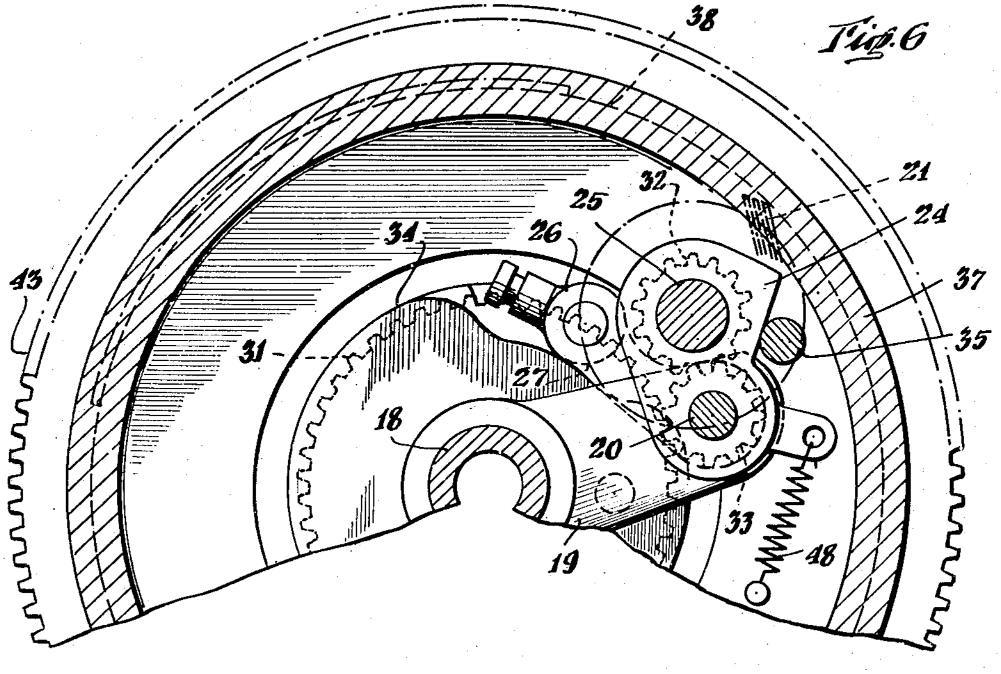
Fig. 6 is a radial section of a part of the mechanism of Fig. 2, taken on line VI—VI.

In Fig. 4, the cam follower arms 26 are each shown under the influence of a tension spring 47 which tends to pull the cam follower 27 against the cam 28. The action of the cam follower 27 on the pitch surface 34 of the cam 28 is shown in the section of Fig. 5. The cam follower 27, constantly rotating through its connection with the constantly rotating shaft 18, is continuously moving across the pitch surface 34 during the operation of the reading apparatus 13 of this invention. The cam 28 is a radial cam and the cam follower 27 is a roller contact follower. The profile of the base curve of the cam 28 may be generally described as four straight line combinations separated by a pair of high dwells and a pair of low dwells. The cam 28 will, therefore, produce two up strokes and two down strokes in one 360° revolution. The shaft 20, which is oscillated by the up-and-down strokes of the cam follower 27, turns in a counterclockwise direction on the down stroke, as seen in Figs. 4, 5 and 6, and in a clockwise direction on the up stroke, as seen in Figs. 4, 5 and 6. The counterclockwise motion of each shaft 20 has a corresponding effect upon its respective brush block holder 23, causing the brush block holder to tilt. This tilting action of the brush block holder 23 and the brush block 22 causes its respective brushes 21 to be moved away from the card engaging position shown in Fig. 4. The reverse or clockwise motion of the shaft 20 has the opposite effect on its respective brush block holder 23, brush block 22 and brushes 21. Thus, it is seen that the brushes 21 move out of the card engaging position when the cam follower 27 moves with its down stroke and into card engaging position when the cam follower moves with its up stroke.

The pressure roll crank 23, under the influence of its respective and adjacent pin 35 and a tension spring 47 reciprocates between an in and an out position. The spring 48 tends to hold its respective crank 24 in the out position, shown in Fig. 6. The counterclockwise motion of the pin 35 moving with its respective supported brush block holder 23 counteracts the influence of the spring 48 and moves the crank 24 with its pressure roll shaft 25 and gear 32 in a radially inward direction. Thus, the pressure rolls which are mounted on the respective pressure roll shafts 25 are extended and retracted with relation to the sensing stations 14 and 15. At the same time, the brushes 21 are extended and retracted.

Among the important applications of this invention in the reading of tabulating cards is the ability to cause more than one line of printing from a single card and the ability to cause different fields of a single card to be accumulated in a single counter in an operation otherwise known as crossfooting.

In reading the tabulating cards in an accounting or a computing machine with the reading apparatus of this invention, a card may be repetitively read and two cards may be simultaneously compared. In this reading apparatus, a card can be fed to one of the sensing stations 14 or 15 and the card moving apparatus can be controlled to hold the card at the sensing station while the sensing brushes repeatedly pass over the card in successive reading operations. Thus, it is possible to take two successive readings of the same card and equally compare them. This may be important in checking the accuracy of the reading of the card where inaccuracy, because of some physical condition, is feared.

Similarly, successive cards can be read so as to be checked one against the other. For example, a card may be positioned in the sensing station 15, and another card may be positioned in the sensing station 14, and these two cards read simultaneously. The information derived from the simultaneous reading of these two cards can be compared and checked.

As indicated above, it is also advantageous in reading punched IBM tabulating cards to move brushes across the punched perforations. This dynamic reading reduces or eliminates errors due to physical imperfection or obstruction in the perforations. The moving of brushes across the cards has a tendency to clear partially blocked perforations. Moving cards with respect to brushes or vice versa has tendency to cause better tracking; that is, the brush is more likely to find the hole even if the card is off-punched or positioned wrongly. Further, with multi-strand brushes, the first strands are more apt to sweep the contact surface clean and allow the following strands to make contact. If the original inaccuracy was due to some foreign matter, lodged in one of the perforations, the motion of the brushes over the card would tend to remove the foreign matter or to otherwise improve the perforation.

Various modifications of the above described embodiment may be made without departing from the spirit of this invention. For example, the cards could be moved in the same direction as the brushes. The counter movement of the cards and the brushes 10 is preferred.

The features of this invention may be applied to other data sensing operations and are not limited solely to card reading. Therefore, it will be understood that it is intended that the scope of this invention be limited solely by the appended claims.

What is claimed is:

1. In a device for sensing data on a perforated tabulating card, means for feeding tabulating cards intermittently to a plurality of sensing stations, and continuously rotatable, retractable and extendible means for cooperation with said sensing stations for intermittently sensing said data on said tabulating cards and relatively fixed means cooperating with said continuously rotatable means to actuate the retraction and extension of said means in cooperation with said sensing stations.

2. In combination with a device as claimed in claim 1, retractable and extendible brushes as means for intermittently contacting said cards positioned on said sensing stations.

3. In a device for sensing data on perforated tabulating cards, a combination of intermittently operable feed rolls, rotatable means cooperating with the said feed rolls for intermittently moving said cards to and from a plurality of sensing stations, a continuously rotating mechanism co-axial with said rotatable means, extendible and retractable brush supporting means mounted on said continuously rotating mechanism, brushes mounted on said supporting means for intermittently contacting said cards and sensing said data on said cards, and relatively fixed means cooperating with said continuously rotating mechanism to actuate the extension and retraction of said brush supporting means.

4. A card reading apparatus including in combination, a succession of card feed rolls, rotatable means cooperable with said feed rolls for moving said cards, a continuously rotating shaft, a cam stationary with relation to said continuously moving shaft and said rotatable means, a cam follower mounted on and rotating with said shaft, a brush supporting means fixed with relation to said cam follower and moving therewith, and sensing brushes mounted on said brush supporting means radially movable with relation to said shaft and said feed rolls, whereby said brushes are moved in and out of card engaging and information sensing position.

5. In a device for reading tabulating cards, means for introducing tabulating cards into said device, intermittently operable card moving means for moving said cards through said device, at least two sensing stations in said device, said card moving means being operable to hold said cards stationary in said sensing stations, at least two retractable and extendible sensing means continuously rotatable independently with relation to said card moving means, said sensing means being equal in number to said sensing stations and operable to simultaneously sense data on said cards positioned stationary in said sensing stations.

6. In a device as claimed in claim 5, said card moving means comprising in combination, a pair of intermittently rotatable drums engageable with said cards, feed rolls positioned adjacent said drums to engage said cards therebetween, and means for intermittently operating said drums to intermittently advance said cards and position said cards at said sensing stations.

7. In a device as claimed in claim 5, said sensing means comprising two sets of electrical sensing brushes cooperable with said sensing stations to read information punched in said tabulating cards, means for rotatably supporting said brushes with relation to said card advancing means and said sensing stations, a cam actuated mechanism for each of said sets of brushes and brush supporting means, and cam means for operating said cam actuated means to simultaneously extend and retract said sets of brushes with respect to said sensing stations.

8. Sensing means in a device as claimed in claim 5, including a set of brushes cooperable with said sensing stations to read data on said tabulating cards, a reciprocable shaft supporting said brushes, a reciprocable arm attached to and movable with said shaft, and means for moving said arm with a reciprocatory motion to cause said brushes to extend and retract with relation to said sensing stations upon rotation of said sensing means.

9. In a device for reading tabulating cards, a combination of sensing stations receiving said tabulating cards for reading punched data, a stationary member, sensing means for reading data on said tabulating cards movable with relation to said sensing stations and said stationary member, a cam fixed on said stationary member and cooperating with said sensing means to cause extension and retraction of said sensing means in relation to said sensing stations, and drive means for moving said sensing means with relation to said sensing stations and said stationary member.

10. Sensing means as claimed in claim 9, comprising at least two sets of electrical brushes cooperable with said sensing stations to read data on tabulating cards positioned on said sensing stations, a pair of shafts reciprocably supporting at least two of said sets of sensing brushes, and a cam follower engageable with said cam to reciprocate said shaft upon rotation of said sensing means and to provide extension and retraction of said brushes with relation to said sensing stations.

11. In a device for reading tabulating cards, a combination of card introducing and advancing means for moving said cards through said device, at least two sensing stations receiving said tabulating cards, a stationary member fixed with relation to said card advancing means, sensing means revolvable with relation to said stationary member, rotatable means associated with said sensing means engageable with said tabulating cards positioned on said sensing stations and revolvable with relation to said advancing means and said stationary member, a cam mounted on said stationary member, and means actuated by said cam for moving said sensing means and said rotatable card engageable means radially with respect to said sensing stations.

12. A cam actuated device comprising in combination, a stationary member, a first shaft axially rotatable with relation to said stationary member, a cam mounted on said stationary member, a support member mounted on and rotatable with said rotatable shaft, at least one auxiliary shaft mounted oscillatably in said support member, a cam follower secured to said auxiliary shaft to cause oscillation of said shaft; a tension device attached to said cam follower to urge rotatable movement of said cam follower and said auxiliary shaft; a surface of said cam acting on said follower to cause oscillation thereof and said shaft; and members mounted on said auxiliary shaft movable radially and circumferentially of said stationary member and said first rotatable shaft upon rotation of said first shaft and said support member around said stationary member.

No references cited.